United States Patent [19]
Noda

[11] Patent Number: 5,459,785
[45] Date of Patent: Oct. 17, 1995

[54] DTMF SIGNAL RECEIVING CIRCUIT

[75] Inventor: Mitsuhiko Noda, Kyoto, Japan

[73] Assignee: Rohm Co., Ltd., Kyoto, Japan

[21] Appl. No.: 98,907

[22] Filed: Jul. 29, 1993

[30] Foreign Application Priority Data

Aug. 4, 1992 [JP] Japan .................................. 4-208075

[51] Int. Cl.$^6$ .................................................. H04M 11/08
[52] U.S. Cl. ........................... 379/386; 379/67; 379/283
[58] Field of Search ........................... 379/386, 67, 283;
328/167; 340/171; 381/56

[56] References Cited

U.S. PATENT DOCUMENTS

| | | | |
|---|---|---|---|
| 4,127,846 | 11/1978 | Mori et al. ............................ | 340/171 |
| 4,473,720 | 9/1984 | Hegi ...................................... | 379/355 |
| 4,741,029 | 4/1988 | Hase et al. ........................... | 379/355 |
| 4,791,379 | 12/1988 | Hughes ................................. | 328/167 |
| 4,797,931 | 1/1989 | Furukawa et al. .................... | 381/56 |
| 4,868,863 | 9/1989 | Hartley et al. ....................... | 379/98 |

FOREIGN PATENT DOCUMENTS 4-200157  7/1992  Japan .

*Primary Examiner*—Jeffery A. Hofsass
*Assistant Examiner*—Jacques M. Saint-Surin
*Attorney, Agent, or Firm*—Dickstein, Shapiro & Morin

[57] ABSTRACT

A DTMF signal receiving circuit which is capable of freely selecting a frequency of a received dial tone signal. The DTMF signal receiving circuit receives a DTMF signal, decodes the DTMF signal, and outputs the signal as the decoding result. The DTMF signal receiving circuit comprises a dial tone signal detecting circuit for freely selecting a frequency of a dial tone signal which is the object of detection in accordance with a supplied selection signal, and a judging circuit for judging whether or not the signal as the result of detection of the DTMF signal is output on the basis of the output of the dial tone signal detecting circuit.

6 Claims, 4 Drawing Sheets

DTMF SIGNAL RECEIVING CIRCUIT

BACKGROUND OF THE INVENTION

1. Field of the Invention

The present invention relates to a DTMF signal receiving circuit and, more particularly, to a circuit structure which effectively extracts a DTMF signal from a received signal transmitted from a telephone line.

2. Description of the Related Art

In home telephones having an answering function, it is possible to remote-control various devices by operating them from an external telephone. This remote control is achieved by receiving a DTMF (Dual Tone Multiple Frequency) signal.

FIG. 6 shows a circuit diagram of an answering machine. A ringer circuit 12 and a speech network circuit 14 for adjusting the level of a voice signal or the like are connected to a hook switch 10. A DTMF signal receiving circuit 16, a recording/reproducing circuit 18 for recording and reproducing the voice information received by the speech network circuit 14, and a dial circuit 20 are connected to the speech network circuit 14, and these circuits are controlled by a controller 22.

The DTMF signal receiving circuit 16 detects a DTMF signal on the basis of the signal received from the speech network circuit 14, decodes the received DTMF signal, converts the signal into data of 4 bits or the like, and outputs the data to the controller 22. For example, when remote-controlling an answering machine or the like, an identification number consisting of DTMF signals is supplied from an external telephone or the like, and a remote control signal composed of DTMF signals is then supplied. The controller 22 can therefore operate the recording and reproducing operations on the basis of the remote control signal. It is also possible to control home appliances or a home security system by outputting the remote control signal to various devices connected to the telephone.

In such a DTMF signal receiving circuit, for example, when a user switches off the loop of the telephone line by the on-hook operation or the like after supplying the identification number and before supplying the remote control signal, a monitoring signal, what is called a dial tone signal, which shows the connecting state between the telephone and the telephone exchange is supplied, which sometimes causes malfunctions of various devices. Why such malfunctions are caused will be explained in detail in the following.

It is now assumed that the dial tone signal is composed of fundamental frequency components of 400 Hz. The width of the fundamental frequency component varies depending on the various conditions of the telephone line or the like. When the fundamental frequency component has a frequency of 395 Hz as shown in FIG. 7, for example, higher harmonic components which are twice and three times as high as the fundamental frequency appear in the DTMF signal receiving circuit 16. As shown in FIG. 7, the higher harmonics have a frequency of 790 Hz and 1185 Hz, and these higher harmonic signals exist in the frequency band of the DTMF signal. The DTMF signal receiving circuit 16 detects the higher harmonic signals which are similar to the DTMF signal, and these higher harmonic signals cause malfunctions.

In order to solve the problem, the device described in Japanese Patent Laid-Open No. Hei 4-200157, for example, is provided with a means for detecting a dial tone signal from the received signal so that the device doesn't decode the DTMF signal when detecting the dial tone signal.

Although the DTMF signal is standard throughout the world, the dial tone signal varies depending on the country. Within Japan, different dial tone signals are used. For example, Nippon Telegraph & Telephone Public Corp. uses a dial tone of 400 Hz and DDI Corp. uses a dial tone of 900 Hz. However, since the conventional dial tone signal detecting circuit can only detect the dial tone signal having one kind of frequency, it is necessary to provide a dial tone signal detecting circuit in accordance with the frequency of the dial tone signal of the user.

SUMMARY OF THE INVENTION

Accordingly, it is an object of the present invention to eliminate the above-described problem in the related art and to provide a DTMF signal receiving circuit which is capable of freely selecting the frequency of the dial tone signal received from the user.

To achieve this aim, the present invention provides a DTMF signal receiving circuit for extracting and decoding a DTMF signal from the signal received from the telephone line and outputting the decoded signal. The DTMF signal receiving circuit is incorporated into a telephone to which a telephone operating office supplies a dial tone signal as a monitoring signal for examining the loop connection state when the telephone line loop is cut off by returning the receiver on the cradle. The DTMF signal receiving circuit comprises: a frequency selecting means for selecting the frequency of the dial tone signal which is the object of detection in accordance with a supplied selection signal; a dial tone detecting means for detecting, from the received signal, the dial tone signal having the frequency selected by the frequency selecting means; and a judging means for judging that the decoded signal is ineffective when the dial tone detecting means detects the dial tone signal having the selected frequency.

In the present invention, it is possible to easily or automatically select the frequency of the dial tone signal supplied from the telephone exchange via the telephone line when the telephone is in the on-hook state. It is therefore very easy to cope with the dial tone signals by the same telephone which have different frequencies set by different countries or communication companies.

The above and other objects, features and advantages of the present invention will become clear from the following description of the preferred embodiment thereof, taken in conjunction with the accompanying drawings.

DESCRIPTION OF THE PREFERRED EMBODIMENT

The present invention will now be explained in more detail with reference to the following embodiment.

Figure 1:
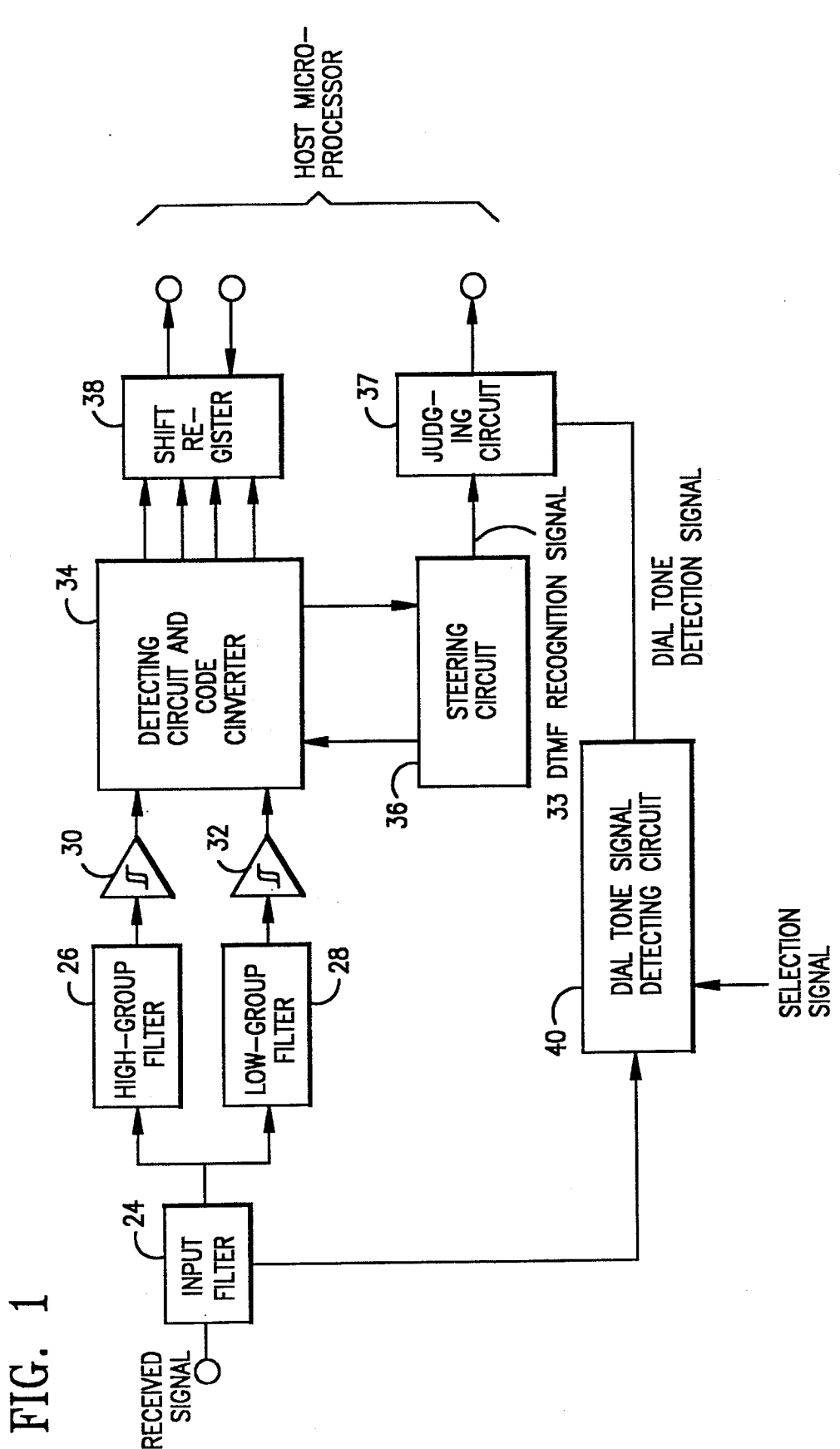
FIG. 1 is a block diagram of the structure of an embodiment of a DTMF signal receiving circuit according to the present invention.

FIG. 1 shows an embodiment of a DTMF signal receiving circuit according to the present invention. The circuit is provided with an inputting filter 24 for amplifying and filtering a received signal (including a DTMF signal). The inputting filter 24 is composed of an input buffer, a rejection filter of 60 Hz, an AGC circuit, an anti-aliasing filter, a dial tone filter and the like. At the stage subsequent to the inputting filter 24 are provided a high-group filter 26 and a low-group filter 28 which together form a band pass filter, and the DTMF signal is divided into a signal of higher frequencies and a signal of lower frequencies. Zero-cross comparators 30 and 32 are next connected to both filters 26 and 28, and the DTMF signal is converted into a binary signal by comparators 30 and 32.

A detecting circuit and code converter 34 is connected to the comparators 30 and 32. The detecting circuit and code converter 34 detects whether or not the DTMF signal is received, decodes two DTMF signals which were received by the high-group filter 26 and the low-group filter 28, and converts the signals into data of 4 bits which is used as remote control information.

In addition, a steering circuit 36 and a shift register 38 are connected to the detecting circuit and code converter 34. When the detecting circuit and code converter 34 detects an effective DTMF signal, it supplies an enable signal to the steering circuit 36. The steering circuit 36 receives the enable signal and outputs a DTMF recognition signal 33 to a judging circuit 37.

A dial tone signal detecting circuit 40 is connected to the input terminal of the inputting filter 24. The dial tone signal detecting circuit 40 detects a dial tone signal from the received signal and supplies the dial tone detecting signal to the judging circuit 37.

The judging circuit 37 and a shift register 38 are connected to a host microprocessor through printed wiring (not shown in FIG. 1).

Figure 2:
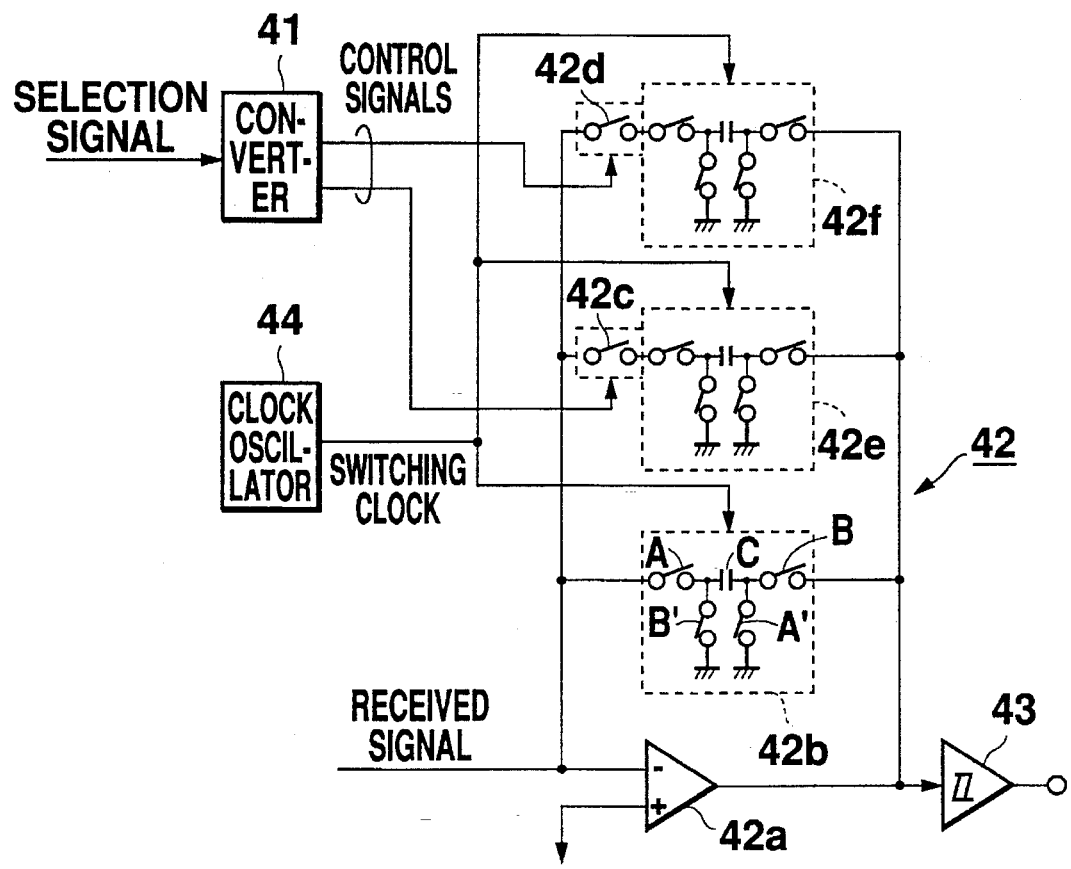
FIG. 2 shows a first example of a dial tone signal detecting circuit.

FIG. 2 shows a first example of the dial tone signal detecting circuit 40. The dial tone signal detecting circuit 40 is composed of a converter 41 for converting serial selection signals received from the external telephone into parallel control signals which control switches 42d and 42c, a band pass filter 42 for passing only a dial tone signal having a frequency in accordance with the control signal from the converter 41, and a zero-cross comparator 43 for reshaping a passing signal of the band pass filter 42 into a rectangular wave.

The band pass filter 42 is composed of an amplifier 42a, a first switched-capacitor 42b which is connected to the amplifier 42a so as to be negatively fed back, and second and third switched-capacitors 42e and 42f which are connected to the amplifier 42a so as to be negatively fed back, via the switches 42c and 42d which are turned on and off in accordance with the control signal of the converter 41.

Each of the switched-capacitors 42b, 42e, and 42f is composed of analog switches A—A' and B—B' made of MOSFET, for example, and a capacitor C. The on/off operation of the analog switch A—A' or B—B' is sequentially controlled by the clock of a fixed switching frequency output from a clock oscillator 44.

The selection signal is, for example, serial data of 2 bits which can select four different states of the switches 42c and 42d by turning on and off the switches 42c and 42d as shown in Table 1. In other words, four different kinds of frequencies can be selected in the band pass filter 42.

(TABLE 1)

| Selection signal | Switch 42c | Switch 42d |
|---|---|---|
| 00 | OFF | OFF |
| 01 | OFF | ON |
| 10 | ON | OFF |
| 11 | ON | ON |

For example, as shown in FIG. 2, when both switches 42c and 42d are off, only the first switched-capacitor 42b is connected to the amplifier 42a. The analog switches A—A' and B—B' are alternately turned on and off in accordance with the clock of the fixed switching frequency from the clock oscillator 44, thereby functioning as equivalent resistance. Thus, the passing frequency of the band pass filter is determined.

In this way, it is possible to select the frequency of a dial tone signal which is capable of determining and detecting the passing frequency of the band pass filter 42 by inputting into the converter 41 the selection signal which is predetermined by each communication company or country, switching the switches 42c and 42d in accordance with the output of the converter 41, and selecting the switched-capacitor which is connected in parallel with the amplifier 42.

Figure 3:
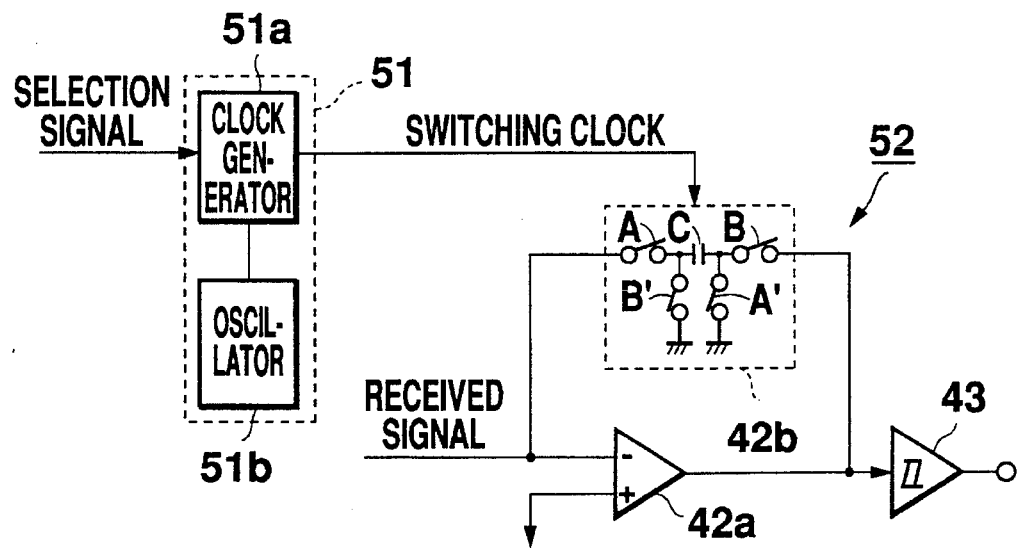
FIG. 3 shows a second example of a dial tone signal detecting circuit.

FIG. 3 shows a second example of the dial tone signal detecting circuit 40. A converter 51 is composed of a clock generator 51a and an oscillator 51b, and the switched capacitor 42b is connected to the amplifier 42a so as to be negatively fed back. The switched-capacitor 42b is composed of the analog switches A—A' and B—B', and the capacitor C in the same way as in the first example, and the on/off operation of the analog switches A—A' and B—B' are controlled by the switching clock having a variable frequency output from the clock generator 51a.

For example, in order to obtain a pass band for a dial tone signal of 400 Hz, the selection signal is produced so that a switching signal of 60 KHz is output from the clock generator 51a, and in order to obtain a pass band for a dial tone signal of 900 Hz, the selection signal is produced so that a switching signal of 100 KHz is output from the clock generator 51a. In this way, the passing frequency is determined in accordance with the equivalent resistance value (R) of the band pass filter 52 which is calculated from the formula: $R=1/(fxc)$.

Figure 4:
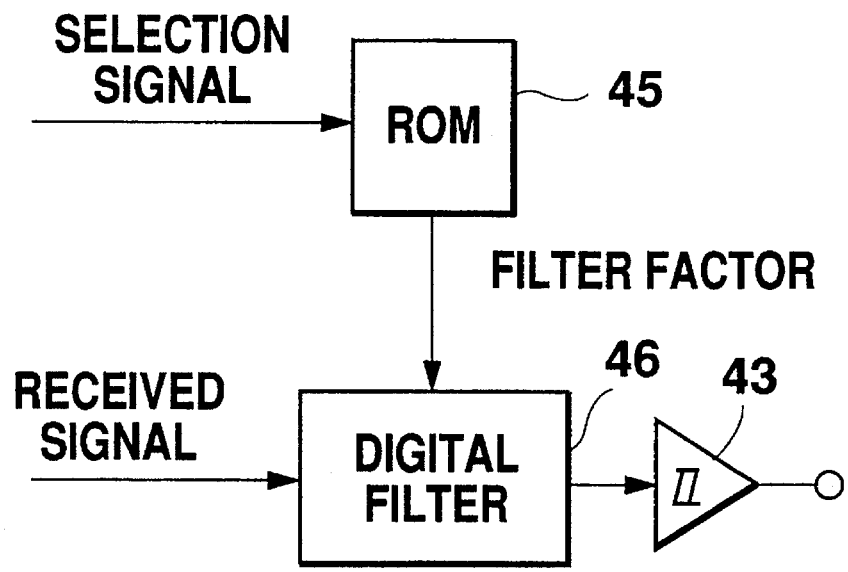
FIG. 4 shows a third example of a dial tone signal detecting circuit.

FIG. 4 shows a third example of the dial tone signal detecting circuit 40. This is composed of a ROM 45 which stores a filter factor, a digital filter 46, and a zero-cross comparator 43. In this dial tone signal detecting circuit 40, the filter factor of the digital filter 46 to which the received signal is input is selected from the ROM 45 on the basis of the selection signal, thereby determining the passing frequency of the digital filter 46.

Figure 5:
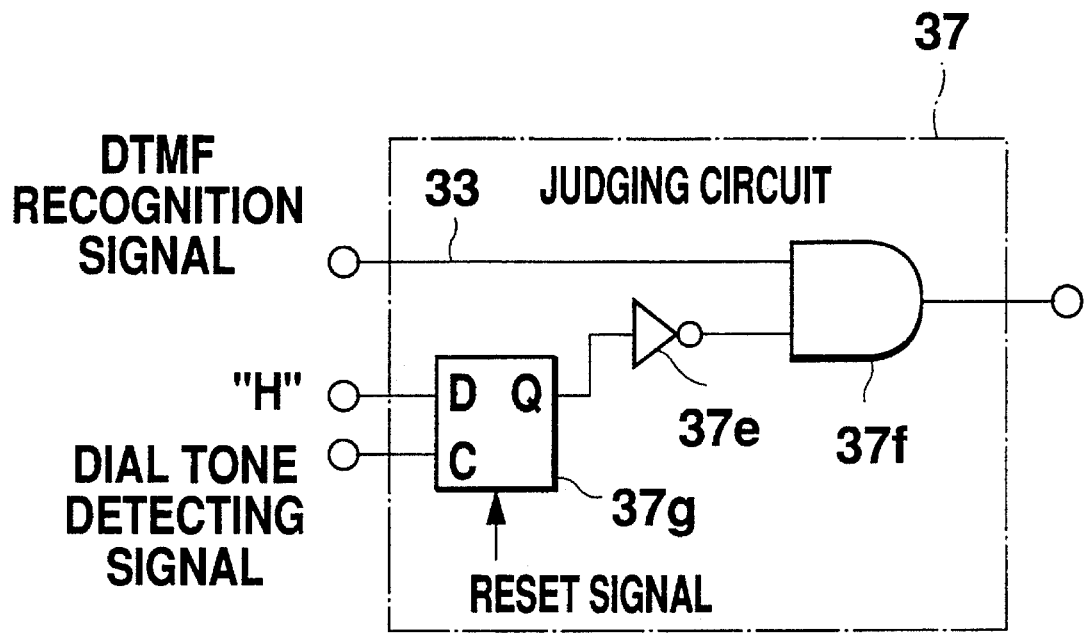
FIG. 5 shows an example of the internal circuit of a judging circuit.
Figure 6:
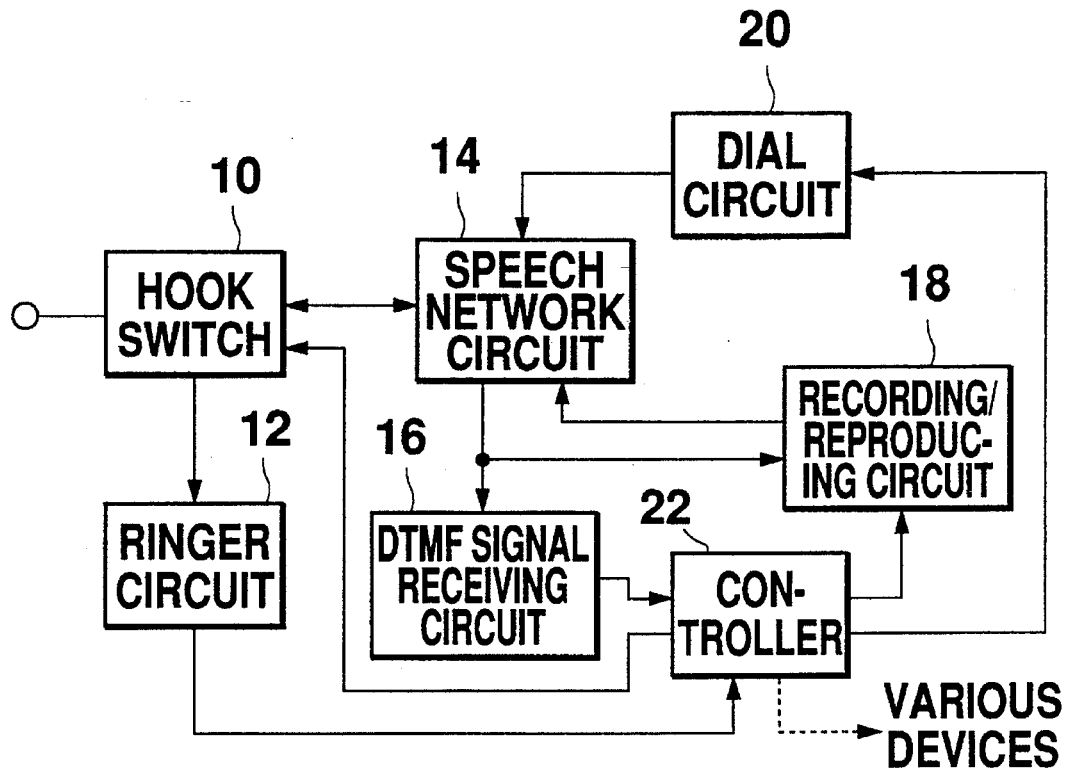
FIG. 6 is a block diagram of the circuit structure of a conventional answering machine.
Figure 7:
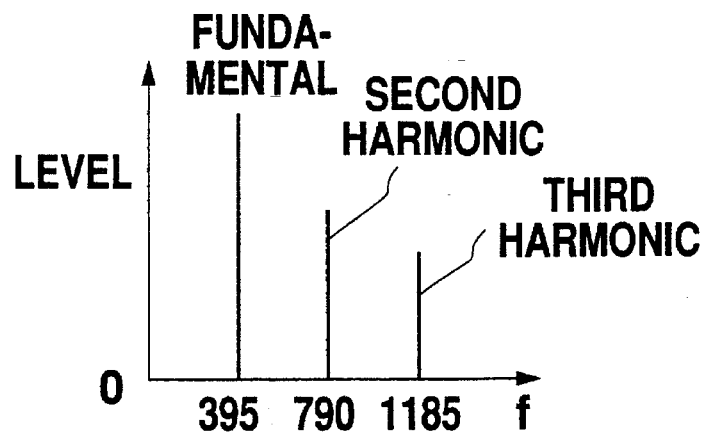
FIG. 7 is an explanatory view of a fundamental frequency component and second and third harmonic frequency components of the dial tone signal.

FIG. 5 shows the internal structure of the judging circuit 37 shown in FIG. 1. The judging circuit 37 is composed of a D flip-flop 37g, an inverter 37e, and an AND-circuit 37f, and outputs a DTMF recognition signal to the host microprocessor (not shown) only when the DTMF recognition signal is input and the dial tone detecting signal is not input.

The operation of the DTMF signal receiving circuit having the above-described structure will now be explained.

When the received signal is input to the inputting filter 24, the DTMF signal contained in the received signal is divided into a signal of higher frequencies and a signal of lower frequencies by the filters 26 and 28, and the two signals are input to the detecting circuit and code converter 34.

The detection circuit and code converter 34 detects whether or not the DTMF signal is received, converts the DTMF signal which is divided into two bands into decode data of 4 bits which is used as remote control information, outputs the decode data to the shift register 38, and outputs an enable signal to the steering circuit 36. The steering circuit 36 which has received the enable signal outputs the DTMF recognition signal 33 to the judging circuit 37.

On the other hand, the received signal is also supplied to the dial tone signal detecting circuit 40 after the higher band thereof is cut off through the inputting filter 24. The dial tone signal detecting circuit 40 detects only the dial tone signal having the frequency determined in accordance with the selection signal as described above, and outputs the dial tone detecting signal which is a rectangular wave signal having the same frequency as the dial tone signal.

For example, when the user performs the on-hook operation after transmitting the DTMF signal which indicates the identification number, the detecting circuit and code converter 34 detects the DTMF signal indicating the identification number, and outputs, for example, a high-level DTMF recognition signal to the judging circuit 37. If the user carries out the on-hook operation at this point, the harmonics of the dial tone signal are received and recognized as the DTMF signal by the detecting circuit and code converter 34, and the DTMF recognition signal is supplied to the judging circuit 37 as described above.

At this time, the dial tone signal detecting circuit 40 detects the dial tone signal and inputs a dial tone detecting signal of 400 Hz having a rectangular wave, for example, into the clock input terminal of the D flip-flop of the judging circuit 37. Since a level signal of the level "H" is input to the data input terminal of the D flip-flop, the output level of the output terminal Q becomes "H". A signal of level "L" is therefore input to the AND-circuit 37*f* via the inverter 37*e*, and the DTMF recognition signal is not output from the judging circuit 37, thereby preventing malfunctions.

On the other hand, when the DTMF recognition signal is normally transmitted from the user, the dial tone signal detecting circuit 40 does not detect the dial tone signal, nor outputs the dial tone detection signal having a rectangular wave. At this time, the D flip-flop 37*g* outputs a signal of the level "L" in accordance with a reset signal, so that the AND-circuit 37*f* outputs the DTMF recognition signal.

When the DTMF signal is output from the judging circuit 37 to the host microprocessor, the host microprocessor outputs a shift pulse for reading serial data to the shift register 38. At the same time, the shift register 38 outputs the decode data of 4 bits to the host microprocessor, thereby enabling various controls.

A selection signal may be manually produced. Alternatively, it may be produced from a result of detecting the frequency of a dial tone signal, or from a recognition signal contained in a received signal.

As described above, according to the present invention, it is possible to securely detect a dial tone signal from a received signal and to avoid malfunctions caused by a higher frequency component of the dial tone signal even when the frequency of the dial tone signal varies depending on countries or communication companies.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. In a telephone which has a DTMF signal receiving circuit for extracting and decoding a DTMF signal for remote control of peripheral equipments from a signal received from a telephone line and outputting the decoded signal, and to which a telephone exchange supplies a dial tone signal as a monitoring signal for examining the loop connection state when the telephone line loop is cut off by returning a receiver on the cradle, said DTMF signal receiving circuit comprising:

a frequency selecting means for selecting a frequency of said dial tone signal which is the object of detection in accordance with a supplied selection signal;

a dial tone detecting means for detecting, from said received signal, said dial tone signal having the frequency selected by said frequency selecting means; and a judging means for judging that said decoded signal is ineffective when said dial tone detecting means detects said dial tone signal having said selected frequency.

2. A DTMF signal receiving circuit according to claim 1, further comprising an output inhibiting means for inhibiting the output of said decoded signal when said judging means judges the ineffectiveness of said decoded signal.

3. A DTMF signal receiving circuit according to claim 1, wherein said dial tone detecting means includes a variable frequency pass type band pass filter.

4. A DTMF signal receiving circuit according to claim 3, wherein said band pass filter includes:

a plurality of switched-capacitor filters each of which operates on the basis of a clock of a fixed frequency;

a filter controlling means for selectively controlling the on/off operation of said plurality of switched-capacitor filters in accordance with said selection signal, whereby a passing frequency is made variable.

5. A DTMF signal receiving circuit according to claim 3, wherein said band pass filter includes:

a clock generating means for generating a clock having a frequency in accordance with said selection signal;

a switched-capacitor filter which operates on the basis of a clock generated from said clock generating means, whereby a passing frequency is made variable.

6. A DTMF signal receiving circuit according to claim 3, wherein said band pass filter is a digital filter.

* * * * *